(12) United States Patent
Hoshino et al.

(10) Patent No.: US 10,733,962 B2
(45) Date of Patent: Aug. 4, 2020

(54) IMAGE GENERATION DEVICE

(71) Applicant: DENSO CORPORATION, Kariya, Aichi-pref. (JP)

(72) Inventors: Hitoshi Hoshino, Kariya (JP); Yuji Kitamura, Kawasaki (JP); Soju Matsumoto, Yokohama (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 8 days.

(21) Appl. No.: 15/738,622

(22) PCT Filed: Jun. 15, 2016

(86) PCT No.: PCT/JP2016/002891
§ 371 (c)(1),
(2) Date: Dec. 21, 2017

(87) PCT Pub. No.: WO2016/208157
PCT Pub. Date: Dec. 29, 2016

(65) Prior Publication Data
US 2018/0182358 A1    Jun. 28, 2018

(30) Foreign Application Priority Data

Jun. 26, 2015 (JP) ................. 2015-128867

(51) Int. Cl.
*G09G 5/24* (2006.01)
*G06F 3/14* (2006.01)
(Continued)

(52) U.S. Cl.
CPC ............... *G09G 5/24* (2013.01); *G06F 3/14* (2013.01); *G09G 5/243* (2013.01); *G09G 5/30* (2013.01); *G09G 5/32* (2013.01)

(58) Field of Classification Search
CPC ............. G09G 5/24; G09G 5/243; G09G 5/32
See application file for complete search history.

(56) References Cited

U.S. PATENT DOCUMENTS 9,058,536 B1 * 6/2015 Yuan ..................... G06K 9/2054
2006/0053048 A1 * 3/2006 Tandetnik .............. G06Q 30/02
705/14.49

(Continued)

FOREIGN PATENT DOCUMENTS

EP    0617374 A1    9/1994
JP    H06161728 A   6/1994

(Continued)

*Primary Examiner* — Grace Q Li
(74) *Attorney, Agent, or Firm* — Harness, Dickey & Pierce, P.L.C.

(57) ABSTRACT

An image generation device includes: a rasterizing portion generating, according string data, an element-blank image including a first element image indicating a first-type string element of a string and a blank image indicating a blank; an embedding portion identifying and embedding a second element image indicating a second-type string element of the string in the blank image; a first data storage portion in which a first data group used to generate the first element image is stored; and a second data storage portion in which a second data group including an image to be embedded as the second element image is stored. The rasterizing portion generates the first element image based on the first data group, and generates the blank image at a position where the second element image is to be embedded by identifying an embedding position of the second element image.

4 Claims, 4 Drawing Sheets

(51) Int. Cl.
    *G09G 5/32*    (2006.01)
    *G09G 5/30*    (2006.01)

(56) References Cited

U.S. PATENT DOCUMENTS

| | | | |
|---|---|---|---|
| 2009/0058623 A1* | 3/2009 | Mino | B60O 9/00 |
| | | | 340/438 |
| 2009/0275351 A1* | 11/2009 | Jeung | H04L 51/066 |
| | | | 455/466 |
| 2011/0185016 A1* | 7/2011 | Kandasamy | G06Q 10/06 |
| | | | 709/203 |
| 2013/0151952 A1* | 6/2013 | Yamamoto | G06F 17/211 |
| | | | 715/243 |
| 2014/0229426 A1* | 8/2014 | Gootee, III | G06F 17/5004 |
| | | | 707/608 |

FOREIGN PATENT DOCUMENTS

| | | |
|---|---|---|
| JP | H06290019 A | 10/1994 |
| JP | H10069477 A | 3/1998 |
| JP | 2002268704 A | 9/2002 |
| JP | 5142597 B2 | 2/2013 |

* cited by examiner

IMAGE GENERATION DEVICE

CROSS REFERENCE TO RELATED APPLICATION

This application is a U.S. National Phase Application under 35 U.S.C. 371 of International Application No. PCT/JP2016/002891 filed on Jun. 15, 2016 and published in Japanese as WO 2016/208157 A1 on Dec. 29, 2016. This application is based on and claims the benefit of priority from Japanese Patent Application No. 2015-128867 filed on Jun. 26, 2015. The entire disclosures of all of the above applications are incorporated herein by reference.

TECHNICAL FIELD

The present disclosure relates to an image generation device.

BACKGROUND ART

An image generation device in the related art adopts a technique to output an image of a string made up of characters to an output device, such as a display (Patent Literature 1). Such an image generation device rasterizes an outline font or the like represented as curves defined by functions, such as a Bezier curve and a spline curve, according to a size of each letter to be displayed by using a font rasterizer, and outputs an image of letters of a shape that best suits an output region.

PRIOR ART LITERATURE

Patent Literature

Patent Literature 1: JP 5142597 B

SUMMARY OF INVENTION

In the above image generation device, when the image generation device draws an image of a string containing multiple types of string elements, for example, a string containing letters and icons, processing becomes complex and program size for the processing is increased. For example, when an image of a string containing an icon between letters, it is normal that a first letter is rasterized through processing by the font rasterizer and the icon is drawn through processing by a program different from the font rasterizer, and a following letter is rasterized through processing by the font rasterizer again. Hence, the processing involves many steps and program size for the processing is increased.

In view of the foregoing difficulties, it is an object of the present disclosure to provide an image generation device which implements an image generation processing by a simplified program and restricts an increase of program size of the image generation processing.

According to an aspect of the present disclosure, an image generation device is provided. The image generation device generates a string image of a string according to string data. The string includes a first-type string element and a second-type string element, and the string data includes control codes indicating the string. The image generation device includes: a rasterizing portion generating, according to the string data, an element-blank image including a first element image indicating the first-type string element and a blank image indicating a blank; an embedding portion identifying and embedding a second element image indicating the second-type string element in the blank image of the element-blank image generated by the rasterizing portion; a first data storage portion in which a first data group including a set of pieces of data used to generate the first element image is stored; and a second data storage portion in which a second data group including a set of pieces of data to be embedded as the second element image is stored. The rasterizing portion generates, according to the string data, the first element image by identifying data necessary to generate the first element image among the pieces of data included in the first data group stored in the first data storage portion and rasterizing the first type string element using the identified data. The rasterizing portion generates, according to the string data, the blank image at a position where the second element image is to be embedded in the element-blank image by identifying an embedding position of the second element image. The second element image is identified among the pieces of data included in the second data group stored in the second data storage portion.

According to the device as above, the element-blank image including the first element image and the blank image is generated first, and subsequently, the second element image is embedded in the blank image of the element-blank image. Hence, image generation processing can be achieved by a simplified program and an increase of program size can be restricted.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, an embodiment of the present disclosure will be described with reference to the drawings.

1. Configuration

Figure 1:
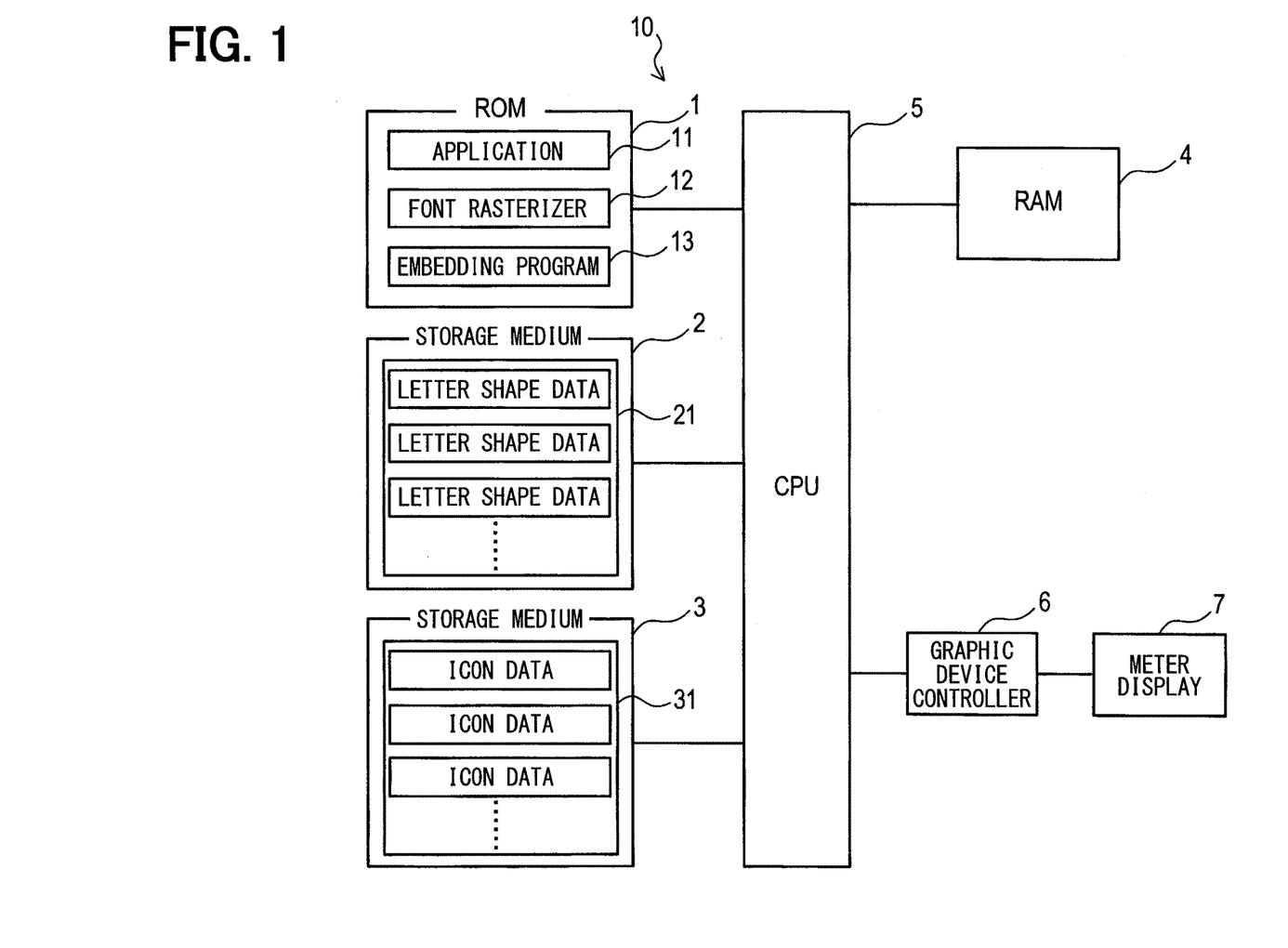
FIG. 1 is block diagram showing a configuration of an image generation device according to an embodiment.

An image generation device 10 of the present embodiment shown in FIG. 1 is equipped to a vehicle, and includes a ROM 1, a storage medium 2, another storage medium 3, a RAM 4, a CPU 5, a graphic device controller 6 (hereinafter, abbreviated to the GDC 6), and a meter display 7.

The ROM 1 pre-stores programs for various types of processing executed by the CPU 5. More specifically, the ROM 1 pre-stores programs for image generation processing described below, such as an application 11, a font rasterizer 12, and an embedding program 13.

The storage medium 2 is formed of a re-attachable USB memory, SD card, or the like. A letter shape data group 21 as a set of pieces of letter shape data is stored in the storage medium 2. The letter shape data is data to convert a letter in a font control code described below into raster data. To be more specific, the letter shape data is made up of a curve called a Bezier curve defined by a function.

The storage medium 3 is also formed of a re-attachable USB memory, SD card, or the like. An icon data group 31 as a set of pieces of icon data necessary for the embedding program 13 to generate an image is stored in the storage medium 3. Each piece of the icon data is a piece of raster data representing an image of a corresponding icon. Strings (each of which includes letters, types of icons, and combinations thereof) are displayable on the meter display 7 by the image generation device 10, and the strings have predetermined multiple patterns. A string described in the present embodiment is one example of such multiple patterns.

The RAM 4 is a work memory where the CPU 5 executes the application 11, the font rasterizer 12, the embedding program 13, and so on to perform the image generation processing described below.

The CPU 5 controls the image generation device 10 comprehensively and provides various functions by loading respective programs used to perform the image generation processing described below from the ROM 1 and executing the loaded programs in the RAM 4.

The GDC 6 controls the meter display 7 to output information on an image of the raster data generated by the CPU 5.

The meter display 7 is a display device provided to a meter (not shown) mounted to the vehicle. The meter display 7 displays an image generated by the image generation processing under a control of the GDC 6.

2. General Outline of Image Generation Processing

A general outline of the image generation processing executed by the CPU 5 of the present embodiment will now be described.

Figure 2:
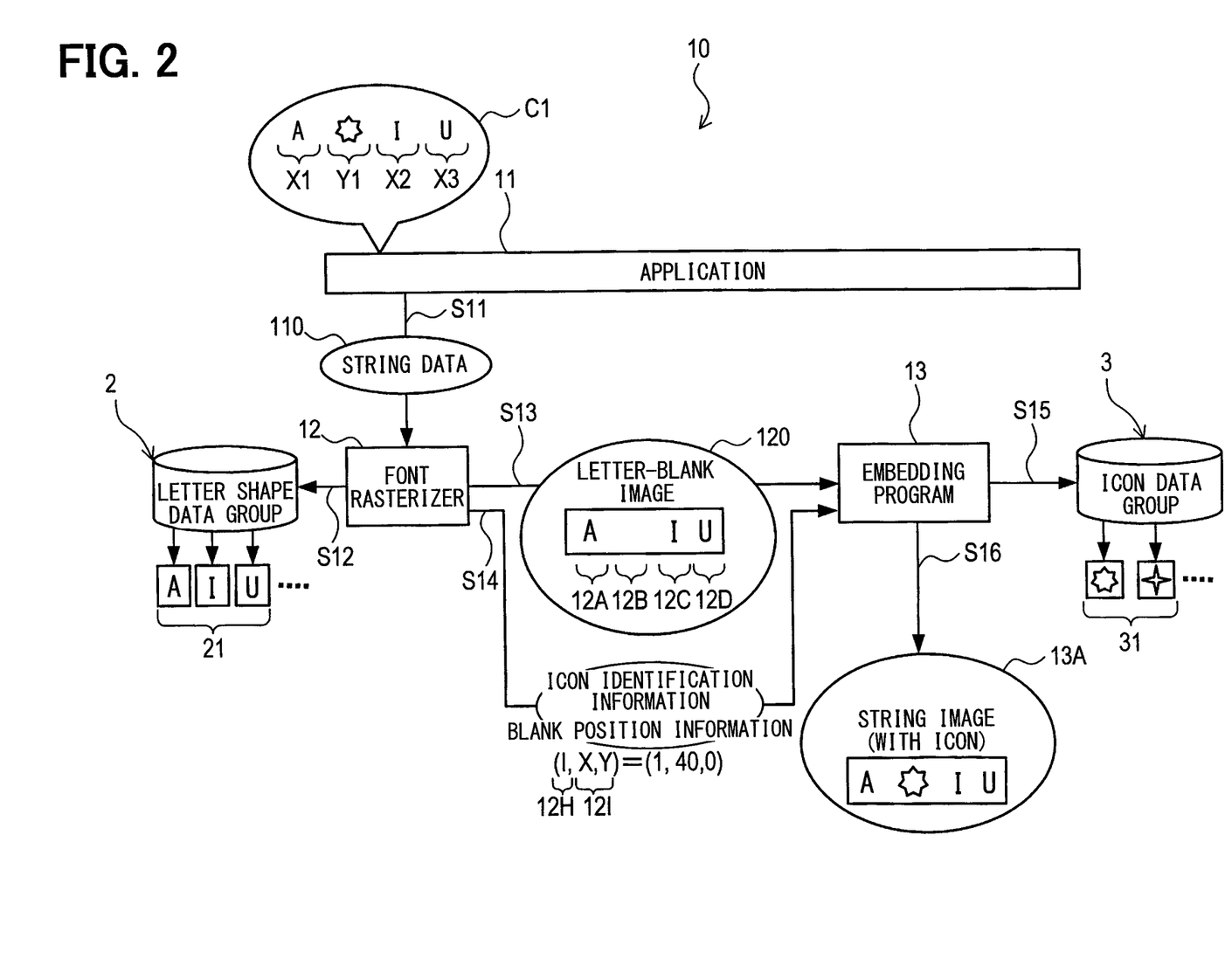
FIG. 2 is a view showing a flow of image generation processing for a string containing multiple letters and one icon.

The image generation processing to display an image of a string containing multiple letters and one icon on the meter display 7 will be described with reference to FIG. 2. A string C1 described in the present embodiment as an example is a character set including multiple letters and one icon. The multiple letters are three Japanese phonetic alphabets called Hiragana letters "A" (letter X1), "I" (letter X2), and "U" (letter X3). The one icon is a star icon (icon Y1). The characters are arranged in order of the Hiragana letter "A" (letter X1), the star icon (icon Y1), the Hiragana letter "I" (letter X2), and the Hiragana letter "U" (letter X3) from left to right. In the following description, the application 11, the font rasterizer 12, and the embedding program 13, each of which is provided by software and executed by the CPU 5, implements the image generation processing and controls a flow of data.

First, the application 11 passes string data 110 corresponding to the string C1 to the font rasterizer 12 (S11). An image of the icon Y1 is not generated in processing (S12 and S13) executed by the font rasterizer 12 after S11. The font rasterizer 12 generates a blank image 12B as a blank portion in place of generating an image of the icon Y1. Icon data representing the icon Y1 is embedded into the blank image 12B later by the embedding program 13 through processing (S15 and S16) described below.

The string data 110 is a set of control codes including letter identifiers, hereinafter, abbreviated to IDs, a blank ID (in other words, an ID of the icon Y1), and information on a width of the blank image 12B. In the present embodiment, the letter IDs mean font control codes, which are control codes of Hiragana letter (font) portions "A", "I", and "U" in the string data 110.

In the present embodiment, the respective control codes are set as follows.

Font control code of Hiragana letter "A"=0x3042
Blank ID control code=0xFE01
Control code of information on the width of the blank image 12B=0xFE40
Font control code of Hiragana letter "I"=0x3044
Font control code of Hiragana letter "U"=0x3046

The blank ID control code is used when the font rasterizer 12 recognizes a position of the image of the icon Y1 and when the font rasterizer 12 passes information on a type of the icon Y1 to the embedding program 13. The control code of the information on the width of the blank image 12B is used when the font rasterizer 12 generates a letter-blank image 120, to be more specific, when the font rasterizer 12 generates the blank image 12B indicating the information on the width of the image of the icon Y1 in the letter-blank image 120.

Subsequently, the font rasterizer 12 generates the letter-blank image 120 including a letter image 12A, the blank image 12B, a letter image 12C, and a letter image 12D according to the string data 110 passed from the application 11. More specifically, the font rasterizer 12 identifies letter shape data necessary to generate the letter image 12A among all the pieces of data in the letter shape data group 21 stored in the storage medium 2 according to the font control code of Hiragana letter "A", and generates raster data representing the letter image 12A (that is, a portion of the Hiragana letter "A" in the letter-blank image 120) according to the identified letter shape data (S12). Subsequently, the font rasterizer 12 identifies a position (herein, a position between the Hiragana letters "A" and "I") where the icon data is to be embedded in the letter-blank image 120 according to the blank ID control code in the string data 110. The font rasterizer 12 sets aside a space for the blank image 12B in the letter-blank image 120 at a position where the icon data is to be embedded in the letter-blank image 120. Herein, the information on the width of the position where the icon data is to be embedded is identified by the control code of the information on the width of the blank image 12B. Subsequently, the font rasterizer 12 generates raster data representing the letter image 12C and the letter image 12D (that is, portions of the Hiragana letters "I" and "U" in the letter-blank image 120) according to the font control codes of the Hiragana letters "I" and "U", respectively, in the same manner as in the generation of the raster data representing the letter image 12A of the Hiragana letter "A" (S12). In the manner as above, the letter-blank image 120 including the letter image 12A, the letter image 12C, the letter image 12D, and the blank image 12B (set aside at the position where the image of the icon Y1 is to be embedded) is generated, and the font rasterizer 12 passes the letter-blank image 120 to the embedding program 13 (S13). The font rasterizer 12 also passes icon identification information 12H for identifying a type of the icon Y1 and blank position information 12I for identifying a position of the icon data representing the icon Y1 in the letter-blank image 120 to the embedding program 13 according to the blank ID control code (S14). In the present embodiment, the blank position information 12I is identified by information the font rasterizer 12 has acquired from the string data 110, and specifies a coordinate of a leftmost point of the blank image 12B in which the icon data representing the icon Y1 is to be embedded.

The embedding program 13 identifies icon data necessary to generate the image of the icon Y1 among all the pieces of data in the icon data group 31 stored in the storage medium 3 according to the icon identification information 12H passed from the font rasterizer 12 (S15). Subsequently, the embedding program 13 identifies an embedding position of the icon data according to the blank position information 12I passed from the font rasterizer 12, and embeds the icon data into the letter-blank image 120 (S16). In the manner as above, raster data representing a string image 13A of the letter X1, the icon Y1, the letter X2, and the letter X3 is generated.

The string image 13A generated as described above is displayed on the meter display 7 under the control of the GDC 6.

Figure 3:
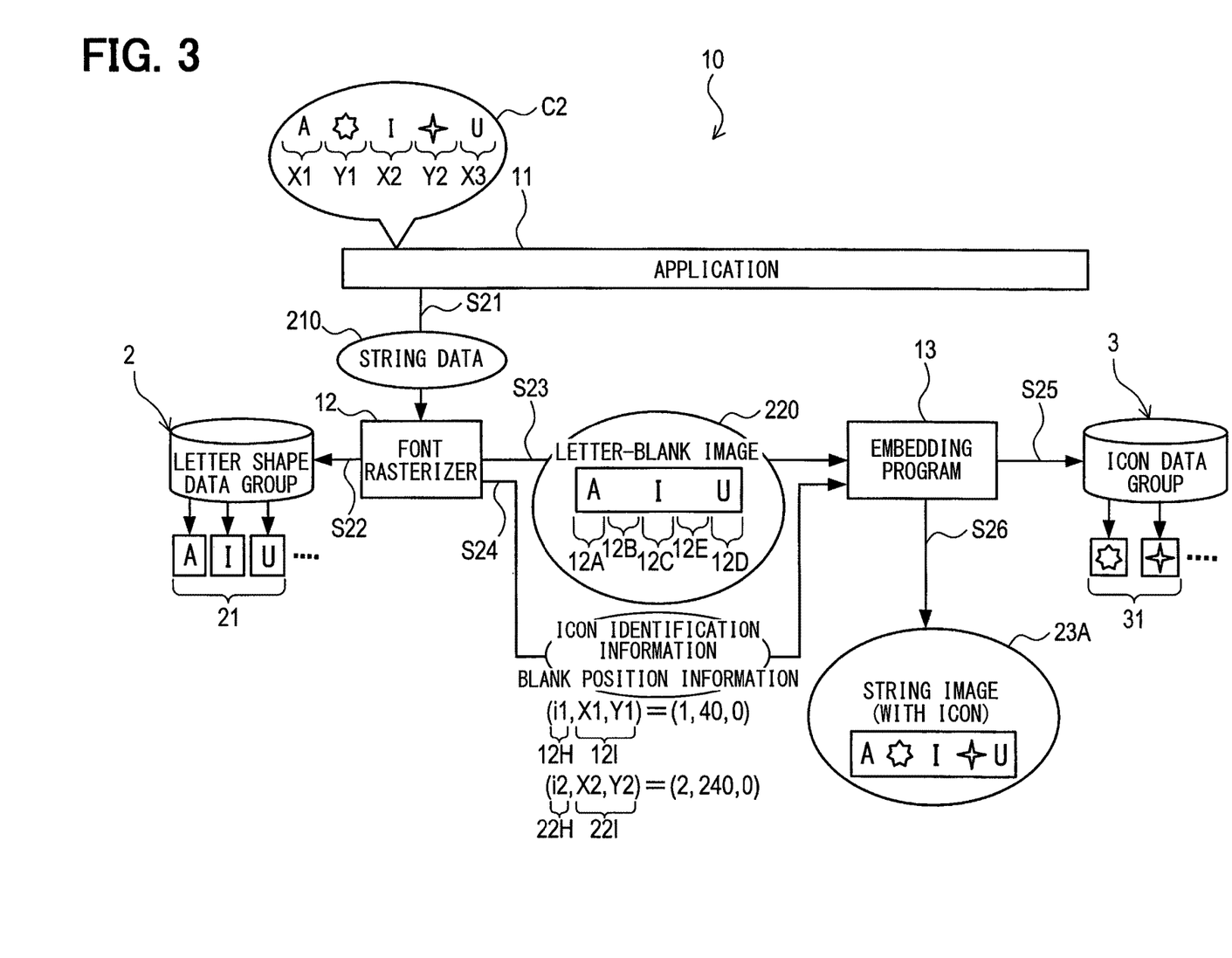
FIG. 3 is a view showing a flow of image generation processing for a string containing multiple letters and multiple icons.

The image generation processing to display an image of a string containing multiple letters and multiple icons on the meter display 7 will now be described with reference to FIG. 3. A string C2 described as an example in the present embodiment includes multiple letters and multiple icons, which are three Hiragana letters "A" (letter X1), "I" (letter X2), "U" (letter X3), and two star icons (icon Y1 and icon Y2) arranged in order of the Hiragana letter "A" (letter X1), the star icon (icon Y1), the Hiragana letter "I" (letter X2), the star icon (icon Y2), and the Hiragana letter "U" (letter X3) from left to right.

First, the application 11 passes string data 210 corresponding to the string C2 to the font rasterizer 12 (S21). Similar to the string data 110 described above, the string data 210 is a set of control codes of letter IDs, blank IDs (that is, IDs of the icon Y1 and the icon Y2), and information on width of a blank image 12B and width of a blank image 12E.

The font rasterizer 12 generates a letter-blank image 220 including the letter image 12A, the blank image 12B, the letter image 12C, the blank image 12E, and the letter image 12D according to the string data 210 passed from the application 11. More specifically, similar to the processing to generate the letter-blank image 120 described above, the font rasterizer 12 first generates raster data representing the letter image 12A (the Hiragana letter "A") (S22), and sets aside a space for the blank image 12B in the letter-blank image 220 at a position where icon data representing the icon Y1 is to be embedded (herein, between the Hiragana letters "A" and "I"). Subsequently, the font rasterizer 12 generates raster data representing the letter 12C (the Hiragana letter "I") (S22), sets aside a space for the blank image 12E in the letter-blank image 220 at a position where the icon data representing the icon Y2 is to be embedded (herein, between the Hiragana letters "I" and "U"), and generates raster data representing the letter image 12D (the Hiragana letter "U") (S22). In the manner as above, the letter-blank image 220 including the letter image 12A, the letter image 12C, and the letter image 12D as well as the blank image 12B and the blank image 12E (set aside at the positions where the images of the icon Y1 and the icon Y2 are to be embedded, respectively) is generated. The font rasterizer 12 passes the letter-blank image 220 to the embedding program 13 (S23). Subsequently, the font rasterizer 12 passes the icon identification information 12H for identifying a type of the icon Y1 and the blank position information 12I for identifying a position of the icon data representing the icon Y1 in the letter-blank image 220 as well as icon identification information 22H for identifying the icon Y2 and blank position information 22I for identifying a position of an image of the icon Y2 in the letter-blank image 220 to the embedding program 13 (S24).

Subsequently, the embedding program 13 identifies icon data necessary to generate images of the icon Y1 and the icon Y2 among all the pieces of data in the icon data group 31 stored in the storage medium 3 according to the icon identification information 12H and the icon identification information 22H passed from the font rasterizer 12 (S25). Subsequently, the embedding program 13 identifies embedding positions of the icon data according to the blank position information 12I and the blank position information 22I passed from the font rasterizer 12, and embeds the icon data into the letter-blank image 220 (S26). Raster data representing a string image 23A including the letter X1, the icon Y1, the letter X2, the icon Y2, and the letter X3 is thus generated.

The string image 23A generated as described above is displayed on the meter display 7 under the control of the GDC 6.

In the manner as above, even when a string contains multiple letters and multiple icons, image generation processing to display an image of the string on the meter display 7 can be implemented similar to a display of an image corresponding to a string containing multiple letters and one icon as described above.

3. Effects

Effects as follows can be obtained by the embodiment described in detail as above.

(1a) A letter image is generated by the font rasterizer 12 by identifying, among all pieces of data in the letter shape data group 21 stored in the storage medium 2, raster data necessary to generate the letter image according to the string data, and rasterizing the raster data of the letter. The blank image is generated at a position where icon data from which to generate an image of the icon is to be embedded by identifying an embedding position of the icon data by the font rasterizer 12 according to the string data. The image of the icon is generated by the embedding program 13 by identifying icon data necessary to generate the icon among all pieces of data in the icon data group 31 stored in the storage medium 3.

According to the configuration as above, a letter-blank image including a letter image and a blank image is generated first and subsequently the icon data is embedded into a portion of the blank image in the letter-blank image. Hence, the image generation processing can be achieved by a simplified program and an increase of program size of the image generation processing can be restricted.

(1b) String data includes a control code indicating information on a width of an icon, and the font rasterizer 12 generates a portion of the blank image in the letter-blank image according to the control code of the information on the width of the icon. According to the configuration as above, even when a string contains multiple icons which are positioned between letters, blanks are set aside in the letter-blank image at positions of the respective icons, and the embedding program 13 embeds the multiple icons in the respective blanks at a time by one-time operation. Hence, it is no longer necessary for the CPU 5 to perform processing by executing the font rasterizer 12 and the embedding program 13 alternately in a repetitive manner, for example, in order of a letter, an icon, a letter, an icon, and so on. Hence, the image generation processing can be executed in a simplified manner.

(1c) The font rasterizer 12 passes the blank position information to the embedding program 13. The embedding program 13 identifies a position of an icon in the letter-blank image with reference to the control code of the information on the width of the icon. The embedding program 13 identifies the embedding position of the icon in the letter-blank image according to the passed blank position information. The configuration as above enables the embedding program 13 to embed the icon to be embedded into the blank image at a proper position. Consequently, a string image exactly same as a string intended to be displayed can be displayed on the meter display 7.

(1d) The string data includes a type code for specifying a type of an icon. The font rasterizer 12 passes information on the type code to the embedding program 13. The embedding program 13 identifies an icon to be embedded into the blank image in the letter-blank image according to the information on the type code. The configuration as above enables the embedding program 13 to properly recognize a type of an icon to be embedded into the blank image.

(1e) Letters in the string are string elements that can be rasterized by the font rasterizer 12, and icons having complex shapes cannot be rasterized by the font rasterizer 12. Accordingly, an image of a string including elements that can be rasterized by the font rasterizer 12 and elements that cannot be rasterized by the font rasterizer 12, such as an icon, can be generated by simple processing.

In the present embodiment, each letter X1, X2, X3 corresponds to an example of a first-type string element, and each icon Y1, Y2 corresponds to an example of a second-type string element. The font rasterizer 12 corresponds to an example of processing executed by a rasterizing portion. The letter image 12A, 12C, 12D corresponds to an example of a first element image. The letter-blank image 120, 220 corresponds to an example of an element-blank image. Icon data included in the icon data group 31 corresponds to an example of a second element image. The letter shape data group 21 corresponds to an example of a first data group. The storage medium 2 corresponds to an example of a first data storage portion. The icon data group 31 corresponds to an example of a second data group. The storage medium 3 corresponds to an example of a second data storage portion. Control code indicating information on the width of the blank image 12B, 12E corresponds to an example of a width control code. The blank position information 12I, 22I, 32I, 42I, 52I, 62I corresponds to an example of position information. The icon identification information 12H, 22H, 32H, 42H, 52H, 62H corresponds to an example of information on a type code.

4. Other Embodiments

While the disclosure has been described with reference to preferred embodiments thereof, it is to be understood that the disclosure is not limited to the preferred embodiments and constructions. The disclosure is intended to cover various modification and equivalent arrangements.

(2a) The embodiment above has described, as an example, the configuration in which the GDC 6 controls the meter display 7 to display a generated string image. The present disclosure is not limited to the configuration described above, and it may be configured in such a manner that a component other than the GDC 6 controls the meter display 7 to display a string image.

(2b) The embodiment above has described, as an example, the configuration in which a string image generated by the image generation processing is displayed on the meter display 7. The present disclosure is not limited to the configuration described above. For another example, a string image may be displayed on a display device of a car navigation system or on a head-up display.

(2c) The embodiment above has described the configuration in which the letter shape data group 21 and the icon data group 31 are stored, respectively, in the storage medium 2 and the storage medium 3 as an example. A configuration of storage media is not limited to the configuration described above. For another example, the letter shape data group 21 and icon data group 31 may be stored in a single storage medium.

(2d) The embodiment above has described the configuration in which icon data in the icon data group 31 is raster data as an example. A configuration of the icon data group 31 is not limited to the configuration described above. For example, icon data may be data of vector rendering or data of 3D model rendering instead.

(2e) The embodiment above has described the configuration in which string data has an ID (blank ID) of an icon to be displayed in a string image as an example. String data is not limited to the data described above. For example, an icon to be displayed in a string image may be identified by appropriate means other than an ID of the icon.

More specifically, string data may be assigned with an ID unique to a string (hereinafter, referred to as string ID). In such a case, the application 11 passes the string ID directly to the embedding program 13. The embedding program 13 refers to a table defining a correspondence between string IDs and icon data for specifying icon data corresponding to the passed string ID. The correspondence referred to herein indicates a correspondence of a string identified by a string ID with respect to a type of an icon included in the string and a position number of the icon in the string. An icon to be displayed in a string image may be identified in the manner as above.

The following will describe a method of using a string ID in a case where an image of the string containing multiple letters and multiple icons as described above is displayed on the meter display 7 (FIG. 3) as an example. Firstly, the application 11 passes a string ID of the string data 210 to the embedding program 13 instead of icon identification information 22H. The embedding program 13 refers to the table stored in a storage medium and identifies icon data necessary to generate images of the icon Y1 and the icon Y2. The embedding program 13 identifies embedding positions of the identified icon data according to the blank position information 12I and the blank position information 22I passed from the font rasterizer 12, and embeds the icon data into the letter-blank image 220. In the manner as above, raster data representing the string image 23A is generated also by the configuration in which string data is assigned with a string ID.

A position number of an icon in a string may be specified by string data instead of the table defining the correspondence between string IDs and icon data. That is, the correspondence specified by the table in such a case is a correspondence between a string identified by a string ID and a type of an icon contained in the string. An icon contained in the string is assigned with an ID. An icon needs to be identified only in the string. Thus, the ID of icon contained in one string may be same as an ID assigned to an icon of a different type contained in another string. Hence, in comparison with the foregoing embodiment where one ID corresponds to one type of icon, the number of IDs can be reduced.

Figure 4:
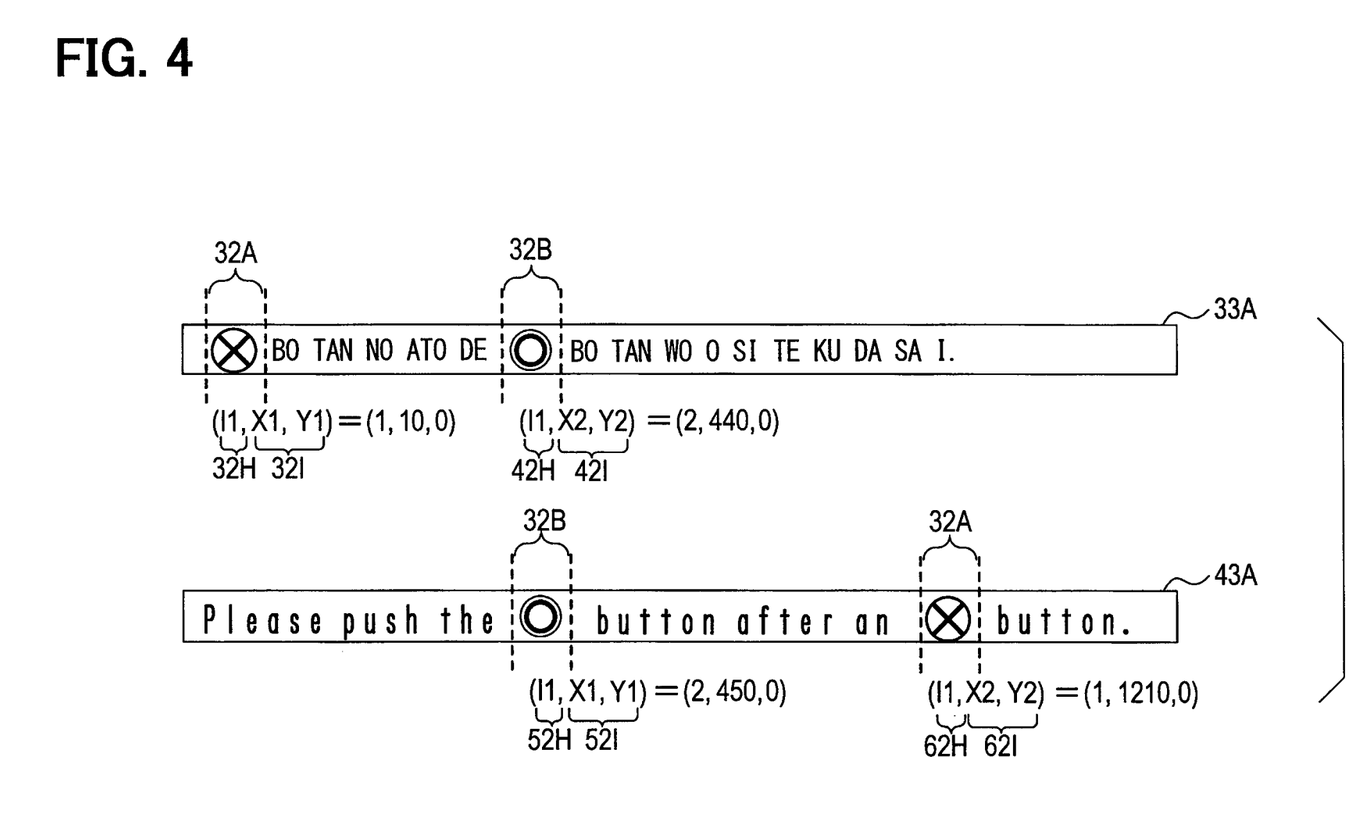
FIG. 4 is a view showing a string image according to a modification.

The following will describe a more concrete example as is shown in FIG. 4 where a Japanese string image 33A and an English string image 43A are switched from each other and displayed on the meter display 7.

A case where a string ID corresponding to the string image 33A is passed from the application 11 to the embedding program 13 will be described first. The embedding program 13 refers to the table in the storage medium regarding the string ID corresponding to the string image 33A, and identifies icon data necessary to generate an icon image 32A and an icon image 32B (icon data representing the icon image 32A and the icon image 32B). The embedding program 13 identifies first icon data (icon data representing the icon image 32A in the string image 33A) of the string image 33A among identified multiple pieces of icon data according to icon identification information 32H passed from the font rasterizer 12. The embedding program 13 identifies a position of the specified icon data in the string image 33A according to blank position information 32I. Likewise, the embedding program 13 identifies second icon data (icon data representing the icon image 32B in the string image 33A) in the string image 33A according to icon identification information 42H. The embedding program 13 identifies a position of the identified icon data according to blank position information 42I. The embedding program 13 embeds the respective pieces of icon data into a letter-blank image. The string image 33A is thus generated.

A case where a string ID corresponding to a string image 43A is passed from the application 11 to the embedding program 13 will now be described. The embedding program 13 refers to the table in the storage medium regarding the string ID corresponding to the string image 43A, and identifies icon data necessary to generate the icon image 32A and the icon image 32B (icon data same as the icon data used to generate the string image 33A). The embedding program 13 identifies first icon data (icon data representing the icon image 32B in the string image 43A) in the string image 43A among identified multiple pieces of icon data according to icon identification information 52H passed from the font rasterizer 12. The embedding program 13 identifies a position of the identified icon data in the string image 43A according to blank position information 52I. Likewise, the embedding program 13 identifies second icon data (icon data representing the icon image 32A in the string image 43A) in the string image 43A according to icon identification information 62H. The embedding program 13 identifies a position of the identified icon data according to blank position information 62I. The embedding program 13 embeds the respective pieces of icon data into a letter-blank image. The string image 43A is thus generated.

According to the configuration as above, in a case where multiple icons are used commonly in different string images by, for example, a function of displaying multiple languages by switching from one to another, string ID's can be common, too. Hence, a size of table for storing specifying information can be further reduced.

(2f) Functions furnished to a single component in the embodiments above may be allocated to two or more components or functions furnished to two or more components may be allocated intensively to a single component.

At least a part of the configurations in the embodiments above may be replaced with a configuration furnished with an equivalent function. A part of the configurations in the embodiments above may be omitted. At least a part of the configuration in any one of the embodiments above may be added to or replace with the configuration of any other embodiment.

What is claimed is:

1. An image generation device comprising:
a memory storing an application program, a rasterizer program and an embedding program;
a processor configured to execute the application program, the rasterizer program and the embedding program stored in the memory,
execution of the application program causing the processor to generate string data corresponding to a string, the string including a plurality of first-type string elements and a plurality of second-type string elements arranged in a predetermined order, each of the plurality of first-type string elements being a letter that can be rasterized by the processor executing the rasterizer program and each of the plurality of second-type string elements being an icon that cannot be rasterized by the processor executing the rasterizer program, the string data including a plurality of control codes including a plurality of font control codes indicating the plurality of first-type string elements and a plurality of blank identification control codes indicating a plurality of blanks in place of the plurality of second-type string elements, each of the plurality of font control codes and the plurality of blank identification control codes being Unicode,
execution of the rasterizer program causing the processor to generate, according to the string data including the plurality of font control codes and the plurality of blank identification control codes, a plurality of first element images indicating the plurality of first-type string elements and a plurality of blank images indicating the plurality of blanks in place of the plurality of second-type string elements one by one in the predetermined order to generate an element-blank image, and
execution of the embedding program causing the processor to identify and embed a plurality of second element images indicating the plurality of second-type string elements in the plurality of blank images of the element-blank image generated by the processor;
a first data storage portion in which a first data group including a set of pieces of data used to generate the plurality of first element images is stored; and
a second data storage portion in which a second data group including a set of pieces of data to be embedded as the plurality of second element images is stored,
wherein:
execution of the rasterizer program further causes the processor to generate, according to the string data, the plurality of first element images by identifying data necessary to generate the plurality of first element images among the pieces of data included in the first data group stored in the first data storage portion and to rasterize the plurality of first type string elements using the identified data and to generate, according to the string data, the plurality of blank images at a plurality of positions where the plurality of second element images are respectively to be embedded in the element-blank image by identifying a plurality of embedding positions of the plurality of second element images;
the plurality of second element images is identified among the pieces of data included in the second data group stored in the second data storage portion.

2. The image generation device according to claim 1, wherein:

the plurality of control codes of the string data includes a plurality of width control codes indicating information on a plurality widths of the plurality of second element images; and execution of the rasterizer program further causes the processor to generate the plurality of blank images in the element-blank image according to the plurality of width control codes.

3. The image generation device according to claim 1, wherein:

the plurality of control codes of the string data includes a plurality of width control codes indicating information on a plurality of width of the plurality of second element images;

execution of the rasterizer program further causes the processor to generate, position information of the plurality of blank images in the element-blank image which is specified with reference to the plurality of width control codes; and execution of the embedding program further causes the processor to identify the plurality of embedding positions of the plurality of second element images in the element-blank image according to the position information.

4. The image generation device according to claim 1, wherein:

the plurality of control codes of the string data includes a type code indicating a type of the plurality of second-type string elements;

execution of the rasterizer program further causes the processor to generate, information on the type code; and execution of the embedding program further causes the processor to identify the plurality of second element images to be embedded in the element-blank image at the plurality of positions of the plurality of blank images according to the information on the type code.

* * * * *